Feb. 21, 1967   J. P. TARBOX ETAL   3,304,889
CROP MATERIAL PELLETER
Filed July 12, 1965
2 Sheets-Sheet 1
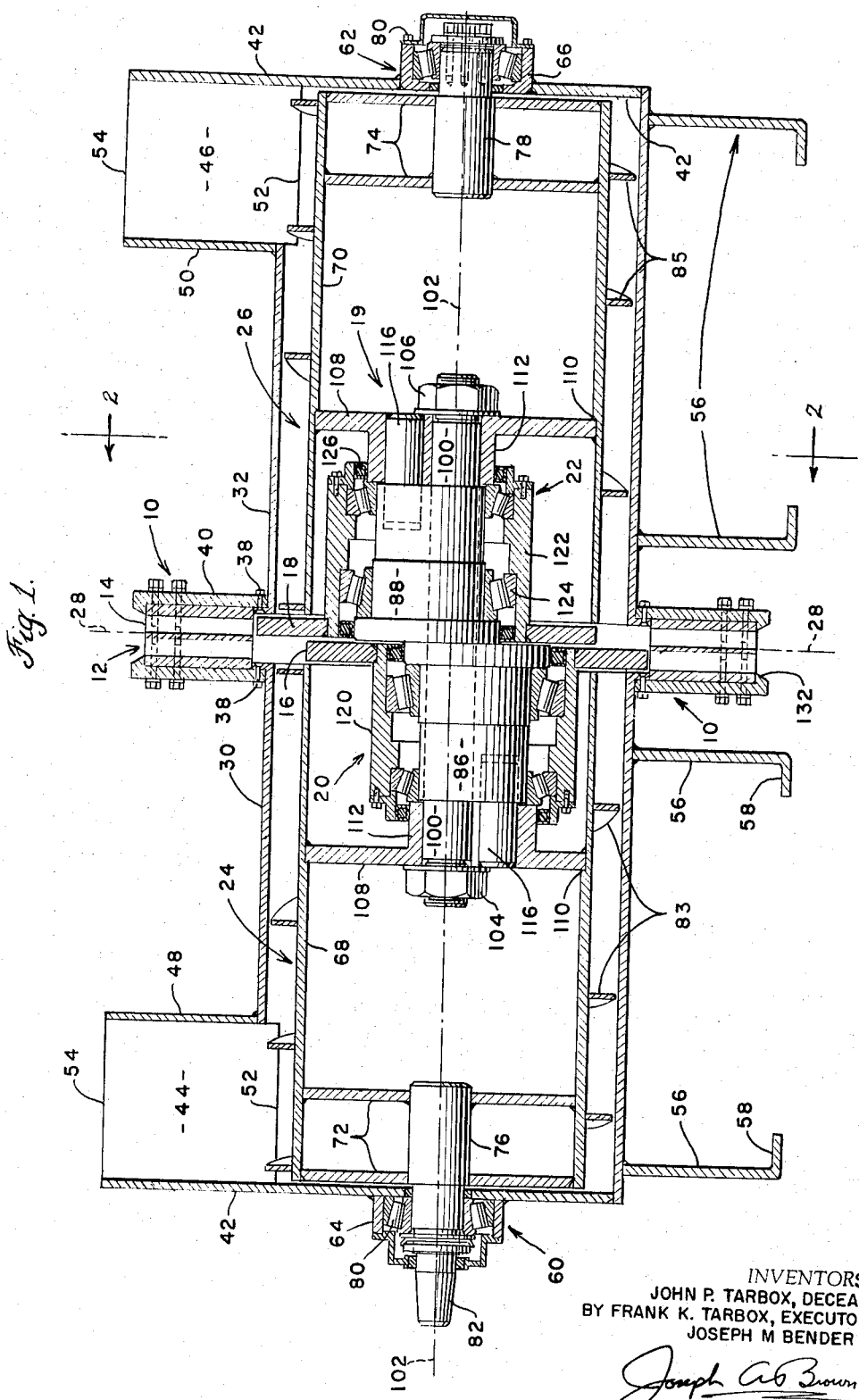
INVENTORS
JOHN P. TARBOX, DECEASED
BY FRANK K. TARBOX, EXECUTOR &
JOSEPH M BENDER
Joseph C.G. Brown
ATTORNEY Feb. 21, 1967 J. P. TARBOX ETAL 3,304,889
CROP MATERIAL PELLETER
Filed July 12, 1965 2 Sheets-Sheet 2
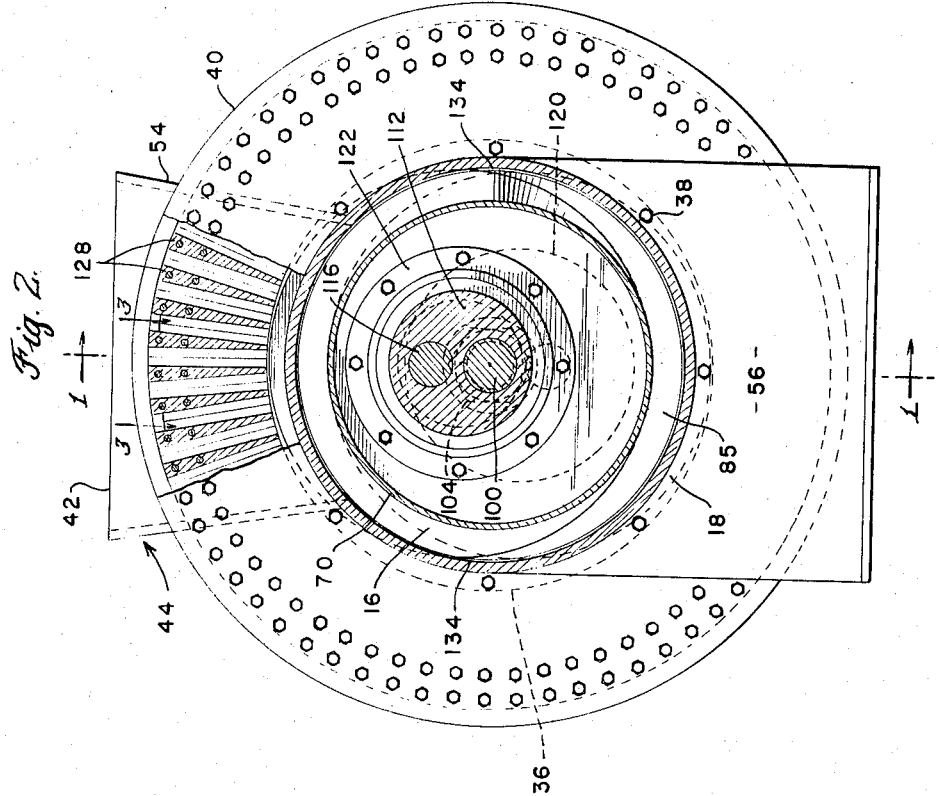
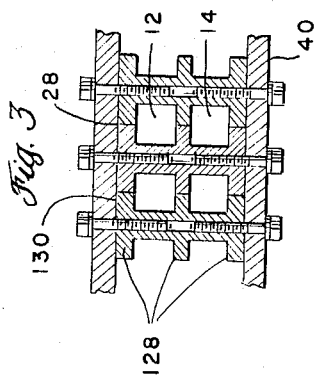
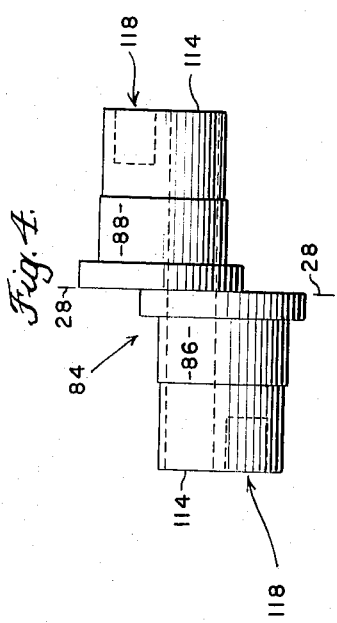
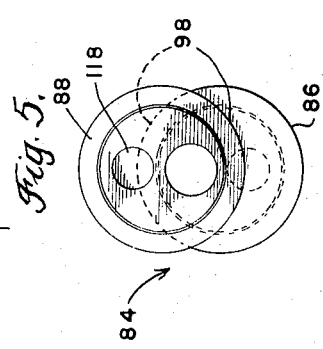
INVENTOR.
JOHN P. TARBOX, DECEASED
BY FRANK K. TARBOX, EXECUTOR
JOSEPH M. BENDER
ATTORNEY

United States Patent Office 3,304,889
Patented Feb. 21, 1967

3,304,889
CROP MATERIAL PELLETER
John P. Tarbox, deceased, late of Delray Beach, Fla., by Frank K. Tarbox, executor, Philadelphia, Pa., and Joseph M. Bender, Leola, Pa., assignors to Sperry Rand Corporation, New Holland, Pa., a corporation of Delaware
Filed July 12, 1965, Ser. No. 471,477
2 Claims. (Cl. 107—14)

This invention relates generally to hay pelleters and more particularly to ring die pelleters.

Machines for pelleting hay and other crop material are of the ring die or piston type, or a combination of the two. The machine of this invention relates to ring die pelleters which have internal compaction means to force material outwardly into angularly spaced radially extending die cells. Frequently, two rollers are employed for this purpose and disposed at diametrically opposite sides of the die ring axis. The unbalanced forces resulting from one of the rollers are offset by the similar forces of the other roller.

One problem with a two roller arrangement is that since the rollers operate in the same plane, their diameters must be less than the radius of the inside of the die ring. This is a disadvantage because it is known that a large diameter roller will produce a more effective compaction of crop material than a small roller. Thus, some pelleters employ only one roller wherein the diameter of the roller is greater than the inside radius of the ring. Such a roller, however, produces unbalanced forces as it orbits because the axis of the roller is offset relative to the die ring axis. Conventionally, the approach has been to handle these forces by employing a heavy, costly mounting arrangement.

A main object of this invention is to provide a ring die pelleter machine having compaction means which has a radial extension greater than the inside radius of the die ring, yet whose forces are balanced.

Another object of this invention is to provide a pelleter of the character described with a plurality of independent pelleting-forming means driven by a common drive means.

Another object of this invention is to provide a pelleter with plural compaction elements having dimensions larger than the internal die ring diameter.

A further object of this invention is to provide a pelleter with a combined conveying and power transmission means.

A still further object of this invention is to provide a pelleter which is of simplified balanced construction, having a high capacity and being relatively inexpensive to manufacture.

Other objects and advantages of this invention will be apparent hereinafter from the specification and from the recital in the appended claims.

In the drawings:

FIG. 1 is a longitudinal vertical section of a ring die pelleter constructed according to the invention and taken on line 1—1 of FIG. 2 looking in the direction of the applied arrows;

FIG. 2 is a transverse cross section in the plane 2—2 of FIG. 1 looking in the direction of the arrows, with a segment of the die ring broken away to show a transaxial cross section of a segment of one of the annular series of dies embodied in the ring;

FIG. 3 is a section taken in the plane 3—3 of FIG. 2 crossing several of the dies exposed in the segment referred to in FIG. 2 showing the details of the die construction;

FIG. 4 is an elevation of the central part of the journalling structure of the rollers, depicting its oppositely disposed eccentric portions and the degree of their overlapping; and FIG. 5 is an end elevation in the structure of FIG. 4.

In the drawings, the units and elements are designated as follows: the die ring by the numeral 10, the adjoining annular series of dies by the numerals 12 and 14, the rollers by the numerals 16 and 18, the journalling structure in general by the numeral 19, the eccentric journalling portions of the structure by the numerals 20 and 22, the two part auger structure by the numerals 24 and 26.

The two annular series 12 and 14 of dies embodied in the die ring 10 are representative of any even number of such series. They axially join each other at the intermediate plane 28/28. The rollers 16 and 18 are rotatable; they are of a large diameter more nearly approaching the internal diameter of the die ring 10 than its radius; they are equiangularly spaced (one hundred and eighty degrees in this case); they are axially offset, yet adjoin each other at the medial plane 28; and thus from FIGS. 1 and 2, it can be seen that the rollers are journalled for rotation and revolution with respect to the die ring upon the eccentric journalling portions 20, 22 of the journalling structure 19. This journalling structure is centrally borne interiorly of the two part auger structure 24, 26; and part 24 of the auger feeds material to be pelleted to roller 16 to be pressed into the dies of series 12 by the roller 16, while the other part 26 feeds material to roller 18 to be pressed into the dies of series 14.

Now as to the details of our machine, it has been so organized to have the two cylindrical halves 30, 32 of the auger casing which constitute the main framework of the machine. This is done by rigidly connecting the auger casing halves 30, 32 to the die ring structure 10, using securing bolts 38 which pass through the end of the auger half and into the annular side wall 40 on each side of the die ring 10. The assembled die ring and the two casing halves 30, 32 connected thereto form a rigid and strong frame structure.

At opposite axial ends of the frame, end walls 42 are provided which close the ends of the casing and extend upwardly to form the outer walls of auger feeding hoppers 44, 46; the inner side walls of the hoppers are formed by members 48, 50 welded to casing halves 30, 32 respectively at edges 52 of the hopper openings cut in the top walls of the casing. Joining walls 54 complete the hopper structure. On the under side of the cylindrical framework casing 30, 32, are welded four machine supporting legs 56 of a width equal to the diameter of the auger casing 30, 32 and of a depth slightly greater than the width of the die ring 10. Each leg 56 is provided with a horizontal flange 58 for bolting to a chassis or a ground foundation as may be needed. End walls 42 of the rigid frame structure are provided with axially extending supporting rings 64, 66 which support the main bearings 60, 62 for the rotatable auger structure 24, 26.

The two part auger structure 24, 26 is comprised of: the two halves of the auger cylinder 68, 70 which are rigidly interconnected together through the roller journalling structure 20, 22 as described below; a pair of spaced end closing diaphragms 72 on auger half 68 and an identical pair of diaphragms 74 on auger half 70; and supporting stubshafts 76, 78 which run in bearings 80 supported in rings 64, 66 on the end walls 42 of the frame. Stubshaft 76 has a tapered extension 82 to receive a driving pulley. Auger flights 83, 85, of opposite hand and of increased pitch on that portion of each half toward the rollers 16, 18, feed the material to be pelleted toward their respective rollers. Suitable strippers (not shown) will be provided as needed on the interior of the auger casing 30, 32.

As shown in FIGS. 4 and 5, journalling structure 20, 22 is comprised of a central shaft member 84 having two eccentric portions 86, 88 which are separated one hundred and eighty degrees and which integrally overlap each other in the end projection (see FIG. 5) by an area 98 defined by segments of the circles of largest diameter of the portions 86, 88. Area 98 is of adequate section in the medial plane 28 to take the torque required to drive both auger halves and rollers 16, 18, and to take the shear load resulting from radial thrust of the rollers. Bolt 100 rigidly interconnects the journalling structure and the auger structure, and when assembled as shown in FIGS. 1 and 2, this bolt becomes centered on the axis 102/102 of the die ring. Threaded ends of bolt 100 pass through thick cast diaphragms 108 welded to the interior of the respective halves of auger cylinder 68, 70 where they bear against shoulders 110. On each diaphragm 108 is cast a large circular projection 112 pointed toward the rollers and of a length to bear against the squared ends 114 of the elongated eccentric portions 86, 88 of the eccentric shaft member 84 of the roller bearing structure 20, 22. When nuts 104 and 106 are tightened, the two halves of the auger structure become rigidly bolted together through the member 84. To prevent relative rotation of the auger halves and member 84, large diametered pins 116 having one end socketed in the recess 118 in the ends 114 of the central shaft 84 and the other end socketed in the abutting extension 112 of diaphragm 108, are provided. The nuts 104, 106 and their washers overlap the pin ends and prevent their displacement. In so functioning as an interconnection between the two halves of the auger 24, 26, the journalling structure of the rollers becomes a part of the auger structure as a whole.

The auger carries the roller journalling structure rigidly upon its own axis of revolution 102 (which is also the axis of the die ring 10) and is rotated by the application of power through the end 82 of stub shaft 76, to provide the means for revolving and rotating the rollers 16, 18.

The roller journalling structure is comprised of roller hubs 120, 122 to which the rollers are welded as shown, and bearings 124 which are placed between the hubs and eccentric portions 86, 88 of the central shaft member 84. The bearings are closed at their ends by packings 126 and are grease filled. Hubs 120, 122 cantileverly support the rollers under the imposed radial thrust.

As shown in FIGS. 1, 2, and 3, the die structure is made up of an assembly of radially extending integral half sections of axially adjoining pairs of dies 128, their planes of division 130 being axial planes extending radially through the centers of the dies. Annular side walls 40 are bolted individually to the section 128 to impart rigidity to the structure. Axially shallow in-turned flanges 132 serve for peripheral alignment of the axially extending radially tapered die sections 128.

This invention makes possible the use of dual large diametered rolls, and has the additional advantage of gravitational and dynamic balance. Because of the balanced roller construction, the machine may be run at greater speeds, thereby substantially increasing the machine capacity.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described the invention, what is claimed is:

1. A pelleting machine comprising a die ring having a pair of axially adjoining angular series of dies and interiorly coacting therewith a pair of radially overlapping and axially adjoining rotatable rollers, said rollers being eccentrically mounted and having axes of rotation spaced 180° apart, each of said rollers coacting with a different but adjoining series of dies, means for relatively revolving said die ring and rollers about an axis through the center of said die ring, an integral one piece common roller journalling structure partially positioned within said die ring and having adjoining eccentric portions, said rollers being mounted for rotation upon said adjoining eccentric portions, auger means adapted for rotation about the axis of the die ring to feed pelleting material to each roller separately, said auger means including two auger flight bearing cylinders of opposite pitch, one of said cylinders being located on each axial side of the die ring, said cylinders being fastened by a rigid connection to the roller journalling structure, the periphery of each roller encircling the axis of the die ring and in axial projection running substantially tangent to the adjacent auger cylinder and to the interior periphery of the series of dies with which it coacts, and said rigid connection being comprised of diaphragms secured interiorly of the respective cylinders and having bolted connection with the opposite ends of the roller journalling structure.

2. A pelleting machine comprising a die ring having a plural number of axially adjoining series of dies, and interiorly coacting therewith a corresponding plural number of annularly equiangularly spaced, radially overlapping and axially adjoining rotatable rollers, said rollers being eccentrically mounted and each of said rollers coacting with a different but adjoining annular series of dies, means for relatively revolving said die ring and rollers about the axis of the die ring, an integral one piece common roller journalling structure having adjoining eccentric portions said rollers being mounted for rotation upon said adjoining eccentric portions, said adjoining eccentric portions of the roller journalling structure being elongated and the rollers being provided with correspondingly elongated hubs which bear them cantileverally upon said elongated portions, auger means adapted for rotation about the axis of the die ring, said auger means including two auger flight bearing cylinders, one of said cylinders being located on each axial side of the die ring, said elongated hubs terminating at locations axially spaced from said rollers on each side of said die ring, and said cylinders being rigidly connected to the roller journalling structure adjacent said locations.

References Cited by the Examiner

UNITED STATES PATENTS

| 1,803,344 | 5/1931 | Noxon | 107—8 |
| 1,804,283 | 5/1931 | Sizer | 107—8 |
| 2,063,404 | 12/1936 | Selman | 107—8 |
| 2,771,640 | 11/1956 | Cotchett | 29—116 |
| 2,783,103 | 2/1957 | Hamilton | 308—181 |
| 3,174,441 | 3/1965 | Lundell | 107—14 |
| 3,202,113 | 8/1965 | Love | 107—14 |

FOREIGN PATENTS

| 939,759 | 10/1963 | Great Britain. |
| 1,387,532 | 12/1964 | France. |

BILLY J. WILHITE, *Primary Examiner.*

WALTER A. SCHEEL, *Examiner.*